Figure 1:
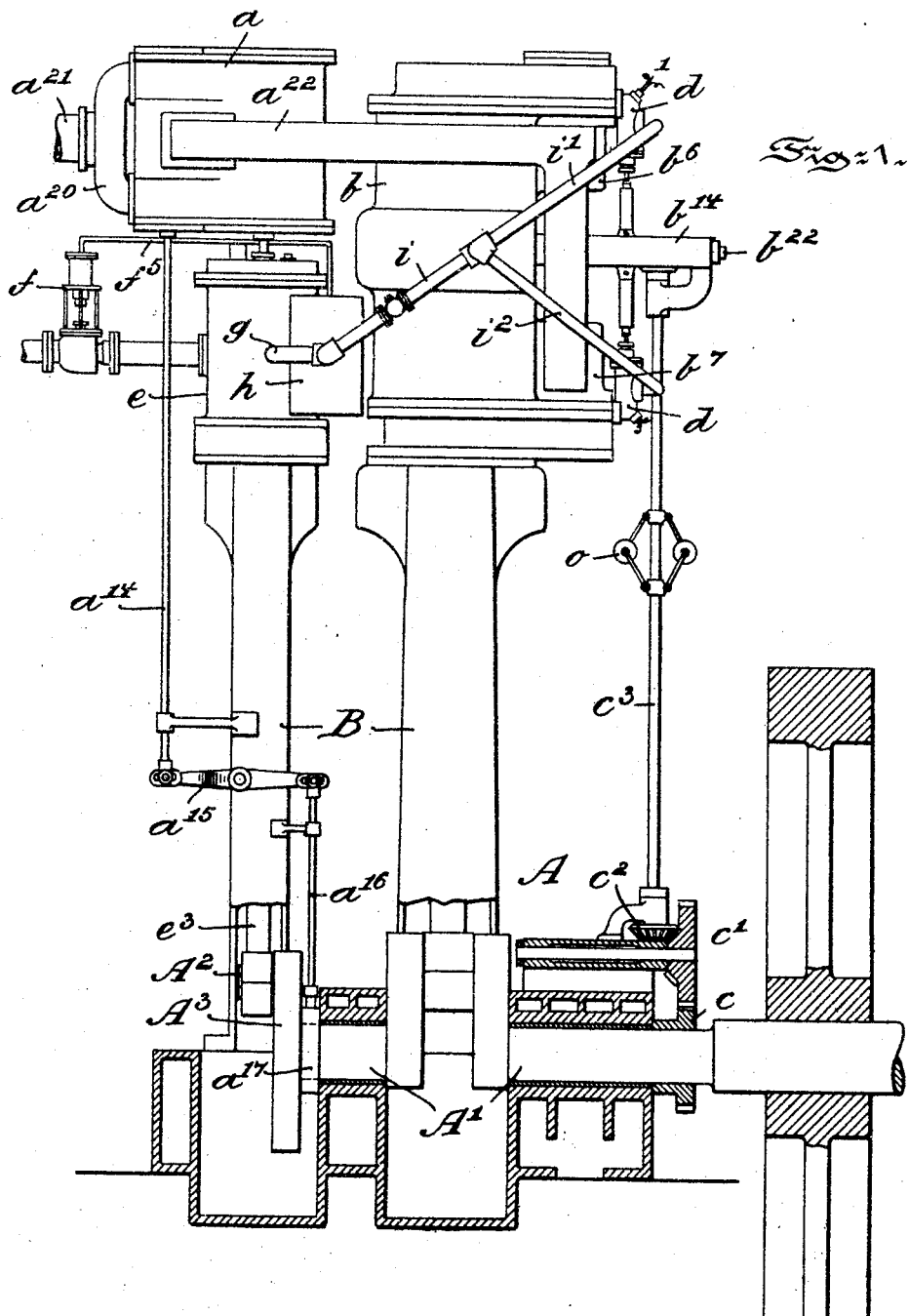

No. 779,406. PATENTED JAN. 10, 1905.
B. M. ASLAKSON.
APPARATUS FOR CONVERTING HEAT DERIVED FROM FUELS INTO ENERGY FOR UTILIZATION.
APPLICATION FILED OCT. 30, 1903.

3 SHEETS—SHEET 1.

Witnesses:
Wilhelm Vogt
Jas. C. Wobmsmith

Inventor:
Baxter M. Aslakson,
By J. Walter Douglas
Attorney

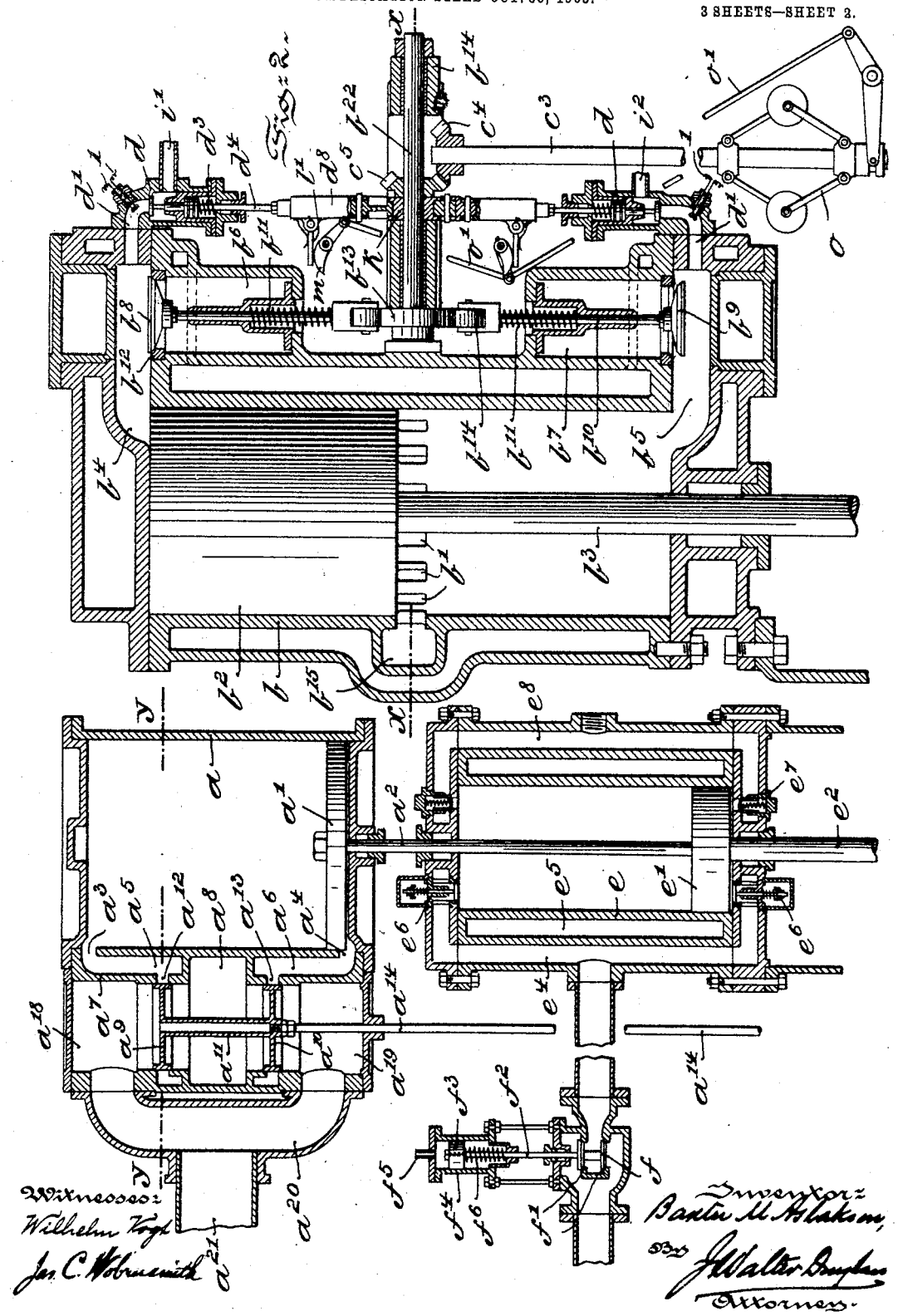

No. 779,406. PATENTED JAN. 10, 1905.
B. M. ASLAKSON.
APPARATUS FOR CONVERTING HEAT DERIVED FROM FUELS INTO ENERGY FOR UTILIZATION.
APPLICATION FILED OCT. 30, 1903.
3 SHEETS—SHEET 3.
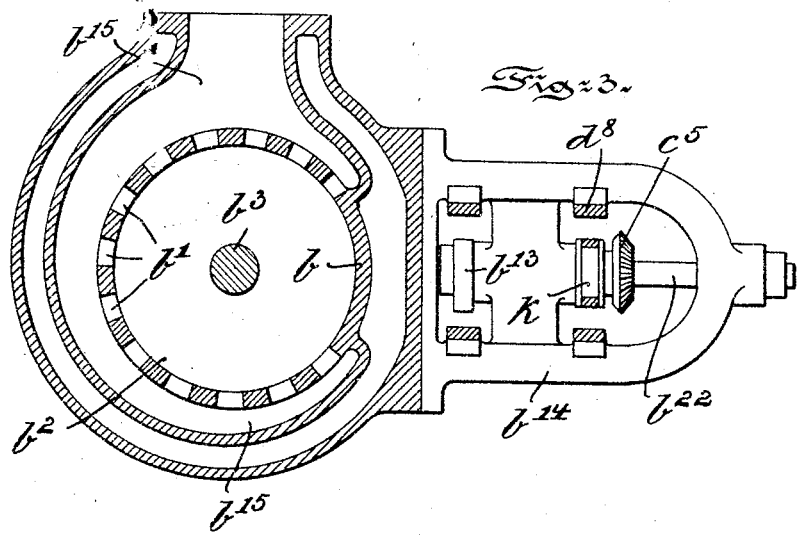
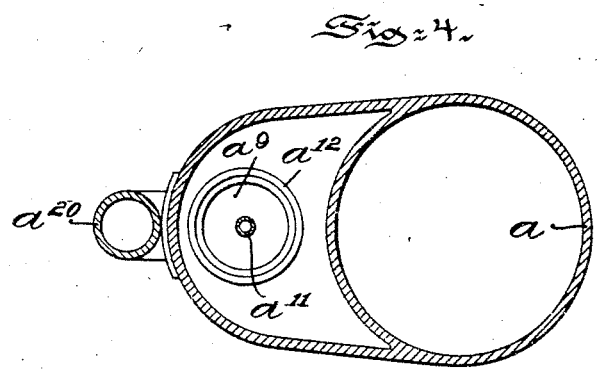
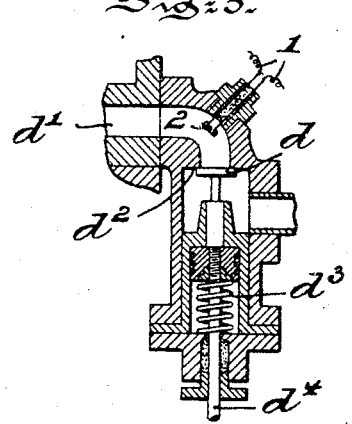
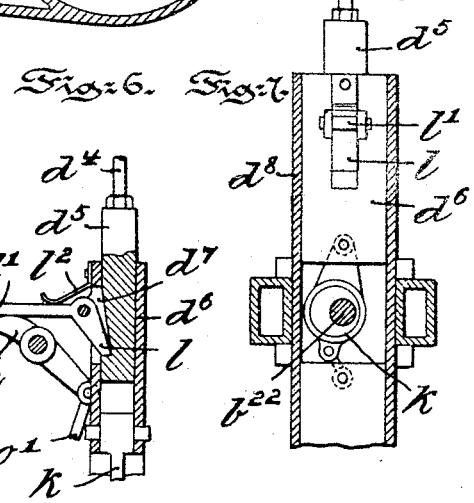

No. 779,406.

Patented January 10, 1905.

UNITED STATES PATENT OFFICE.

BAXTER M. ASLAKSON, OF OIL CITY, PENNSYLVANIA.

APPARATUS FOR CONVERTING HEAT DERIVED FROM FUELS INTO ENERGY FOR UTILIZATION.

SPECIFICATION forming part of Letters Patent No. 779,406, dated January 10, 1905.

Application filed October 30, 1903. Serial No. 179,171.

*To all whom it may concern:*

Be it known that I, BAXTER M. ASLAKSON, a citizen of the United States, residing at Oil City, in the county of Venango and State of Pennsylvania, have invented certain new and useful Improvements in Apparatus for Converting Heat Derived from Fuels into Energy for Utilization, of which the following is a specification.

My invention has relation to an apparatus for converting heat derived from fuels into energy for utilization.

In a companion application for patent filed under date of October 30, 1903, Serial No. 179,170, there are described and claimed, broadly, certain combinations of elements cooperating to form an internal-combustion engine wherein air is first compressed slightly outside the working cylinder and thereafter compressed to maximum pressure in the working cylinder and the gaseous fuel is compressed under a pressure greater than the pressure of air and fed into the working cylinder into and through the air and into contact with an incandescent body in the combustion-chamber of the working cylinder. In the present application the preferred means and mechanisms for carrying into effect the broad principles of said companion application, Serial No. 179,170, form the subject-matter of the claims herein.

The nature and scope of my invention will be more fully understood from the following description, taken in connection with the accompanying drawings, forming part hereof, in which—

Figure 1 is a side elevational view, partly in section, of a double-acting internal-combustion engine embodying main features of my said invention. Fig. 2 is a vertical sectional view, enlarged, of the upper portion of the engine illustrated in Fig. 1, showing the motor-cylinder of the engine and means for compressing air and gas separately prior to their delivery to the motor-cylinder. Fig. 3 is a cross-sectional view on the line $xx$ of Fig. 2, illustrating the motor-cylinder and its connection with an exhaust-duct for the products of combustion and a water-jacket for cooling the same. Fig. 4 is a cross-sectional view on the line $yy$ of Fig. 1, illustrating the air-compressor and the means for controlling the inlet and outlet of air therefrom. Fig. 5 is a detail view, enlarged, showing in longitudinal section a valve controlling the inlet of fuel to the motor-cylinder and the means for igniting the fuel; and Figs. 6 and 7 are respectively detail views, enlarged, illustrating, partly in section and partly in elevation, the means for automatically controlling the fuel-valve.

Referring to the drawings, $a$ is a cylinder, preferably of the shape or outline shown in Figs. 1, 2, and 4, in which is arranged a piston $a'$, receiving its reciprocatory movement by means of a piston-rod $a^2$ from the main or driving shaft $A'$ of the engine A, as will be hereinafter more fully explained. The cylinder $a$ at its upper and lower ends is connected, by means of ducts or ports $a^3$ and $a^4$, with chambers $a^5$ and $a^6$, which are traversed by a cylinder $a^7$, provided with a centrally-arranged chamber $a^8$, as illustrated in Fig. 2. This chamber $a^8$ is normally closed at either end by valve-pistons $a^9$ and $a^{10}$, connected with each other by means of a rod or tube $a^{11}$, so as to be adapted to operate in unison. The valve-pistons $a^9$ and $a^{10}$ also serve to open or close annular ducts or ports $a^{12}$ and $a^{13}$, arranged in the cylinder $a^7$, so as to alternately connect the central chamber $a^8$ with the chambers $a^5$ and $a^6$ and the cylinder $a$ or the open ends of the cylinder $a^7$ with the chambers $a^5$ and $a^6$ and the cylinder $a$. The preferred mechanism for actuating the valve-pistons $a^9$ and $a^{10}$ in the cylinder $a^7$ consists of a piston-rod $a^{14}$, connected with a lever $a^{15}$, pivotally secured to the framework B of the engine A, to which lever by means of a rod $a^{16}$ is imparted an oscillatory movement from an eccentric $a^{17}$, arranged on the main or driving shaft $A'$ of the engine, as illustrated in Fig. 1. The open ends $a^{19}$ and $a^{20}$ of the cylinder $a^7$ are preferably connected with each other and with the open air by a duct $a^{20}$ and tube $a^{21}$, as illustrated in Figs. 1 and 2.

When the piston $a'$ of the cylinder $a$ occupies the position shown in Fig. 2, the valve-pistons $a^9$ and $a^{10}$ are moved upward and in so doing uncover the ducts or ports $a^{12}$ and $a^{13}$. By the following upward movement of the piston $a'$ in the cylinder $a$ the pure air previously admitted into the same in a manner to be hereinafter more fully described is compressed and forced through the duct or port $a^3$, chamber $a^5$, and duct $a^{12}$ into the central chamber $a^8$. At the same time pure air is sucked or drawn into the cylinder $a$ by the upward movement of the piston $a'$, through the tube $a^{21}$ and duct $a^{20}$ into the lower end $a^{19}$ of the cylinder $a^7$, and from the same through the duct or port $a^{13}$, chamber $a^6$, and port $a^4$ into the cylinder $a$ to be compressed and to be fed to the chamber $a^8$ by the downward stroke of the piston $a'$ and the valve-pistons $a^9$ and $a^{10}$. The chamber $a^8$ by means of a conduit or tube $a^{22}$ is connected with air-receiving chambers $b^6$ and $b^7$, preferably formed integral with the motor or working cylinder $b$ of the double-acting engine A, as shown in Figs. 1 and 2. In these receiving-chambers $b^6$ and $b^7$ the air is stored at a pressure of about five pounds to the square inch and is kept therein until the inlet or air valves $b^8$ and $b^9$, arranged in the chambers $b^6$ and $b^7$, permit of the entrance of the air into the combustion-chambers $b^4$ and $b^5$, arranged adjacent to either end of the motor or working cylinder $b$ and communicating therewith, as shown in Fig. 2.

Each of the air or inlet valves $b^8$ and $b^9$ is normally closed and held upon its seat $b^{12}$ by a spring $b^{11}$. The opening of the inlet-valves $b^8$ an $b^9$ against the tension of the spring $b^{11}$ is controlled by a cam $b^{13}$, arranged on a shaft $b^{22}$, which is carried by a bracket $b^{14}$, suitably secured to the working cylinder $b$. The shaft $b^{22}$ receives its rotary movement from the driving-shaft A' by means of gear-wheels $c$, $c'$, and $c^2$, a shaft $c^3$, and beveled gears $c^4$ and $c^5$, as shown in Figs. 1, 2, and 3. The rods $b^{10}$ of the air or inlet valves $b^8$ and $b^9$ are preferably provided with rollers $b^{14}$, which are held in engagement with the cam $b^{13}$ by means of the spring $b^{11}$.

The motor or working cylinder $b$ is provided with a piston $b^2$, and in its central portion is arranged a series of outlet or exhaust ports $b'$, adapted to connect the interior of the cylinder $b$ with an exhaust conduit or duct $b^{15}$, which is in communication with the open air, as shown in Fig. 3. Before the piston $b^2$ has been moved into the position shown in Fig. 2 or reached the end of its upward stroke the same will uncover or free the exhaust-ports $b'$ and will thus permit the products of combustion of a previous charge to escape into the atmosphere. As soon as the uncovering of the exhaust-port $b'$ by the piston $b^2$ takes place the air or inlet valve $b^9$ will be opened by the cam $b^{13}$ and permit of the admission of pure compressed air from the valve-chamber $b^7$ into the working cylinder $b$. The pressure of the products of combustion of the previous charge having been reduced by the escape of the same into the atmosphere, the pure air entering the working cylinder $b$ at this moment will be enabled to completely expel the remaining products of combustion. Nothing but pure air under pressure will now remain in the working cylinder $b$. This air is prevented from escaping into the atmosphere by the back stroke of the piston $b^2$, which again closes the exhaust-ports $b'$, and so confines the air in the working cylinder $b$. From the closing of the ports $b'$ begins the further compression of the previously slightly compressed air, which compression continues until the piston $b^2$ has reached the end of its back stroke and occupies a position opposite to that shown in Fig. 2. The air in its further compression in the working cylinder $b$ is forced by the piston $b^2$ into the lower combustion-chamber $b^5$ and is held therein under a compression varying from three hundred to three hundred and fifty pounds to the square inch, more or less.

The combustion-chamber $b^5$ is in open communication with a duct or conduit $d'$, partially formed by the housing of the motor or working cylinder $b$ and partially formed by the housing of a gas-inlet valve $d$. The end of this duct $d'$ is closed by the gas-inlet valve $d$, which is normally held upon its seat $d^2$ by means of a spring $d^3$. In this duct $d'$, which is filled with highly-compressed pure air, is arranged an igniting device of any suitable construction, but preferably consisting of a wire 1, suitably insulated from the housing of the valve $d$. Through this wire either an alternating or a direct electric current is sent, which holds the portion 2 of the same in a constant incandescent state, which is sufficient to ignite a fuel introduced into the duct $d'$ in the presence of the highly-compressed pure air. In the present instance gas is used as the fuel, which, however, before being permitted to enter the duct $d'$ and the explosion or combustion chamber $b^4$ or $b^5$ is highly compressed to a degree exceeding that of the air which, as hereinbefore explained, has been separately compressed, first slightly and then highly.

The preferred mechanism for compressing the gas prior to its delivery into the duct $d'$ and the explosion or combustion chambers $b^4$ and $b^5$, arranged at either end of the motor or working cylinder $b$ of the engine A, is as follows: As shown in Figs. 1 and 2, directly below the air-compression cylinder $a$ is arranged the gas-compression cylinder $e$, permitting the piston-rod $a^2$ of the air-compression cylinder $a$ to be used as a guide for the piston $e'$ of the gas-compression cylinder $e$ and to be actuated by the same. The piston $e'$, however, is connected by a rod $e^2$ and a connecting-rod $e^3$ with a crank-pin A², eccentrically arranged on the disk A³ of the main or driving shaft A' of the engine. This coupling of the piston $a'$ of the air-compression cylinder $a$ with the piston $e'$ of the gas-compression cylinder $e$ permits of an actuation of both pistons in unison by the driving-shaft A'. Gas from any suitable source (not shown) is admitted through the balanced valve $f$ into a chamber $e^4$, separated from the gas-compression cylinder $e$ by a chamber $e^5$, which is adapted to receive cooling-water. From this chamber $e^4$ the gas is drawn into the cylinder $e$ by the upward movement of the piston $e'$, the suction action of which opens one of the gas-inlet valves $e^6$, arranged in the chamber $e^4$. In the same manner gas will be drawn into the cylinder $e$ by the downward stroke of the piston $e'$, and this gas is now compressed by the upward stroke of the same, and after reaching a certain degree of compression by the piston $e'$—say to about four hundred pounds to the square inch, more or less—is permitted to escape into a chamber $e^8$ through one of the outlet-valves $e^7$. The chamber $e^8$ by a tube $g$ is connected with a storage receptacle or receiver $h$, into which the compressed gas is forced and stored for use. As shown in Fig. 1, from this receiving-tank $h$ the gas by means of the tubes $i$, $i'$, and $i^2$ is conducted to the gas-inlet valves $d$, arranged at either end of the working cylinder $b$. The air having been compressed and confined by the piston $b^2$ in the combustion-chamber $b^5$, as hereinbefore explained, the lower valve $d$ is now opened and the gas admitted into the duct $d'$ in the presence of the compressed air which surrounds the igniter or glower 2. The gas being held under a higher compression than the air forces its way through the same, and as soon as the gas reaches the glower 2 it is instantly ignited in the presence of the air. This ignition extends into the narrow or oblong combustion-chamber $b^5$, causing only a slight increase of temperature of the highly-compressed charge, and the heat generated by the gradual combustion is immediately converted into energy by the expansion of the air, gas, and the products of combustion, which drive the piston $b^2$ upward into the position illustrated in Fig. 2. Owing to the expansion of the gases in the motor-cylinder $b$, an instant decrease in temperature is obtained, which counteracts the increase in temperature which would otherwise be obtained through the combustion of the gases. Furthermore, this expansion of the gases also prevents an increase in pressure, so that only an actual increase in energy through the combustion is obtained. On its upward stroke the piston $b^2$ highly compresses a charge of slightly-compressed air previously introduced therein, and when the same has reached the end of its upward stroke gas under higher compression than the air is admitted through the upper inlet-valve $d$ and into the combustion-chamber $b^4$ in the manner and for the purpose hereinbefore fully explained.

From the foregoing description it will be understood that the air is first slightly compressed outside the working cylinder and then highly compressed in the working cylinder, from which it is forced into the combustion-chamber, and that the gas is compressed outside the working cylinder and then forced into and through the compressed air to be thereafter combined in the presence of an incandescent body, so that the highest temperature of combustion is obtained, not during combustion but before and independently of the combustion, and also that a constant and high compression and consequently the highest possible economy are obtained by the hereinbefore-described mode of converting heat derived from fuels into energy for its utilization. Moreover, thoroughly reliable ignition of a charge under all circumstances is insured without premature or self ignition of the charge being possible.

It is necessary, as practice has demonstrated, to control the amount of gas entering the explosion-chambers $b^4$ and $b^5$ through the inlet-valves $d$. This is accomplished by the following preferred mechanism. In Figs. 2, 6, and 7 the valve-stem $d^4$ is connected with a block $d^5$, loosely mounted in a slide $d^6$, to which is imparted a reciprocatory movement within guides $d^8$ by an eccentric $k$, secured to the shaft $b^{22}$, which shaft by the intervention of a cam $b^{13}$ and inlet-valves $b^8$ and $b^9$ control the admission of slightly-compressed air into the working cylinder $b$. The slide $d^6$ is provided with a tripping mechanism consisting of a pawl $l$, normally held in engagement with a depression $d^7$, arranged in the slide $d^6$, by a spring $l^2$, and of a finger $m$, carried by mechanism not shown. The pawl $l$ normally couples the slide $d^6$ with the block $d^5$, and the valve $d'$ is opened against the tension of its spring $d^3$ by means of the eccentric $k$. An arm $l'$ of the pawl $l$ extends into the path of the finger $m$, which by means of a rod $o'$ is in pivotal connection with a governor $o$, arranged on the shaft $c^3$, which serves to transmit the rotary movement of the driving-shaft $A'$ to the shaft $b^{22}$, as hereinbefore fully explained. According to the double-acting engine each of the gas-inlet valves $d$ is provided with the controlling and tripping device, which are controlled by the governor $o$, as shown in Fig. 2. According to the different speeds of rotation of the governor $o$, the end of the finger $m$ will be more or less raised or lowered by the same and in this manner will be brought sooner or later into engagement with the arm $l'$ of the pawl $l$. As soon as the arm $l'$ strikes the finger $m$ the pawl $l$ will be disengaged from the block $d^5$ and the slide $d^6$ uncoupled from the same. The spring $d^3$, controlling the gas-inlet valve $d$, will now instantly close the said valve $d$. If, however, the tripping device is not actuated by the governor $o$ in the manner hereinbefore explained, the valve $d$ will be permitted to be closed by the action of the spring $d^3$ when the slide $d^6$ is raised by the eccentric $k$. The duration of the opening of the valve $d$ and the amount of gas entering the explosion-chambers of the double-acting or two-cycle engine will in this manner be dependent upon the load under which the engine travels and the corresponding speed of the governor $o$.

In order to prevent further admission of gas into the gas-receiver $h$ when the necessary degree of compression of the gas has been reached, the following preferred arrangement is employed. The stem $f^2$ of the valve $f$ is provided with a piston $f^3$, arranged in a cylinder $f^4$, which by means of a pipe $f^5$ is in open communication with the gas-receiver $h$, as shown in Fig. 1. The gas in the same tends to hold the valve $f$ upon its seat $f'$ by forcing the piston $f^3$ downward in the cylinder $f^4$. This downward movement of the piston is counteracted by a spring $f^6$ tending to raise the piston $f^3$ in the cylinder $f^4$ and holding the valve $f$ open. If the pressure of the gas in the receiver $h$ exceeds the necessary degree of compression, the valve $f$ will be held upon its seats $f'$ against the tension of the spring $f^6$ until the pressure in the receiver $h$ is lowered.

Having thus described the nature and objects of my invention, what I claim as new, and desire to secure by Letters Patent, is—

1. In an apparatus of the character described, a working cylinder, an air-compressor arranged to slightly compress the air and to force the same into the working cylinder, a piston arranged in the working cylinder and adapted to compress the air highly in said cylinder, a combustion-chamber arranged adjacent to one end of the cylinder and communicating therewith, an incandescent body located in said combustion-chamber, a pump arranged to compress gaseous fuel to a pressure higher than the maximum pressure of the air compressed in the cylinder and to feed the same into and through the compressed air and in contact with the incandescent body in the combustion-chamber, a shaft driven by the piston of the working cylinder, and means actuated by said shaft and arranged to control the inlet of air into said working cylinder.

2. In an apparatus of the character described, a working cylinder, an air-compressor arranged to slightly compress air and to force the same into the working cylinder, a piston arranged in the working cylinder and adapted to compress the air highly in said cylinder, a combustion-chamber arranged adjacent to one end of said cylinder, means permitting the air at maximum pressure to enter said combustion-chamber from said cylinder, an incandescent body located in said combustion-chamber, a pump arranged to compress gaseous fuel to a pressure higher than the maximum pressure of the air entering the combustion-chamber, a shaft driven by the piston of the working cylinder, and means controlled by said shaft and adapted to force the compressed gas gradually at its maximum pressure into the combustion-chamber and through the compressed air into contact with the incandescent body.

3. In an apparatus of the character described, a working cylinder, means for first compressing air slightly outside the working cylinder and thereafter compressing said air highly in said cylinder, a combustion-chamber communicating with the working cylinder, an incandescent body located in the combustion-chamber, a source of gaseous-fuel supply, a pump arranged to compress said fuel to a pressure higher than the maximum pressure of the air, a receptacle wherein the fuel is stored under maximum pressure, and means for gradually feeding the fuel from the receptacle into and through the air in the combustion-chamber.

4. In an apparatus of the character described, a working cylinder, means for first compressing air slightly outside the working cylinder and thereafter compressing said air highly in said cylinder alternately at either end thereof, a combustion-chamber arranged adjacent to each end of the cylinder, said combustion-chambers communicating with the cylinder, an incandescent body located in each combustion-chamber, a source of gaseous-fuel supply, a pump arranged to compress said fuel to a pressure higher than the maximum pressure of the air, a receptacle wherein the fuel is stored under maximum pressure, and means for feeding the fuel from the receptacle alternately to one of the combustion-chambers.

In testimony whereof I have hereunto set my signature in the presence of two subscribing witnesses.

BAXTER M. ASLAKSON.

Witnesses:
J. WALTER DOUGLASS,
THOMAS M. SMITH.